United States Patent [19]

Weight et al.

[11] 3,993,158

[45] Nov. 23, 1976

[54] DEVICE FOR LIMITING IN A CONTACT-FREE MANNER THE MOVEMENT OF HYDRAULICALLY OPERABLE MECHANICAL PARTS

[75] Inventors: Armin Weight, Wandofen, Schwerte; Heinz-Walter Warnke, Bremen, both of Germany

[73] Assignee: O & K Orenstein & Koppel Aktiengesellschaft, Berlin, Germany

[22] Filed: Jan. 2, 1976

[21] Appl. No.: 646,258

[30] Foreign Application Priority Data

Jan. 3, 1975 Germany............................ 2500137

[52] U.S. Cl. .............................. 180/134; 91/412; 60/468; 60/494
[51] Int. Cl.² .......................................... B62D 5/06
[58] Field of Search ........... 180/134, 135, 136, 137, 180/138, 139, 152, 153; 280/432; 60/468, 494; 91/412, 189

[56] References Cited

UNITED STATES PATENTS

| | | | |
|---|---|---|---|
| 2,841,231 | 7/1958 | Armington .......................... | 180/139 |
| 3,385,389 | 5/1968 | Symons et al. ..................... | 180/136 |
| 3,451,498 | 6/1969 | Molby ................................. | 180/139 |

Primary Examiner—M. H. Wood, Jr.
Assistant Examiner—R. Schrecengost
Attorney, Agent, or Firm—Walter Becker

[57] ABSTRACT

A device for limiting in a contact-free manner the movement of hydraulically operable mechanical elements, especially for bucket wheel loaders. The device includes a front carriage and a rear carriage. One approaching initiator each is provided on that portion of the front carriage which faces the rear carriage, and the arrangement is such that when turning the steering wheel and when the front carriage angularly approaches the rear carriage, a pertaining thyristor is triggered so that a magnetic valve is energized which through hydraulic control conduits communicates with the tank.

2 Claims, 4 Drawing Figures

DEVICE FOR LIMITING IN A CONTACT-FREE MANNER THE MOVEMENT OF HYDRAULICALLY OPERABLE MECHANICAL PARTS

The present invention relates to a device for limiting in a contact-free manner the movement of hydraulically operable mechanical parts, especially the steering device for bucket wheel loaders with articulated steering. With the heretofore known hydrostatic servo-steering mechanism, the maximum angle of steering or steering lock was effected by means of a mechanically operable valve which did not completely turn off the steering pressure. The reason for this consists in that with a complete turning-off of said steering pressure, due to self excitation of the hydraulic circuit, through the steering system a vibration of the articulated loader would occur. However, even with reduced pressure, by the steering operation against an abutment, pressure oil is unnecessarily generated which means power is used up which then for the remaining function as for instance lifting and tilting of the bucket wheel will no longer be available.

It is, therefore, an object of the present invention to provide a device for a contact-free limitation of hydraulically operable mechanical parts, which will overcome the above mentioned drawbacks and in which the pressure required for the steering hydraulics will be completely turned off prior to the steered vehicle parts abutting each other.

These and other objects and advantages of the invention will appear more clearly from the following specification in connection with the accompanying drawings, in which.

Figure 1:
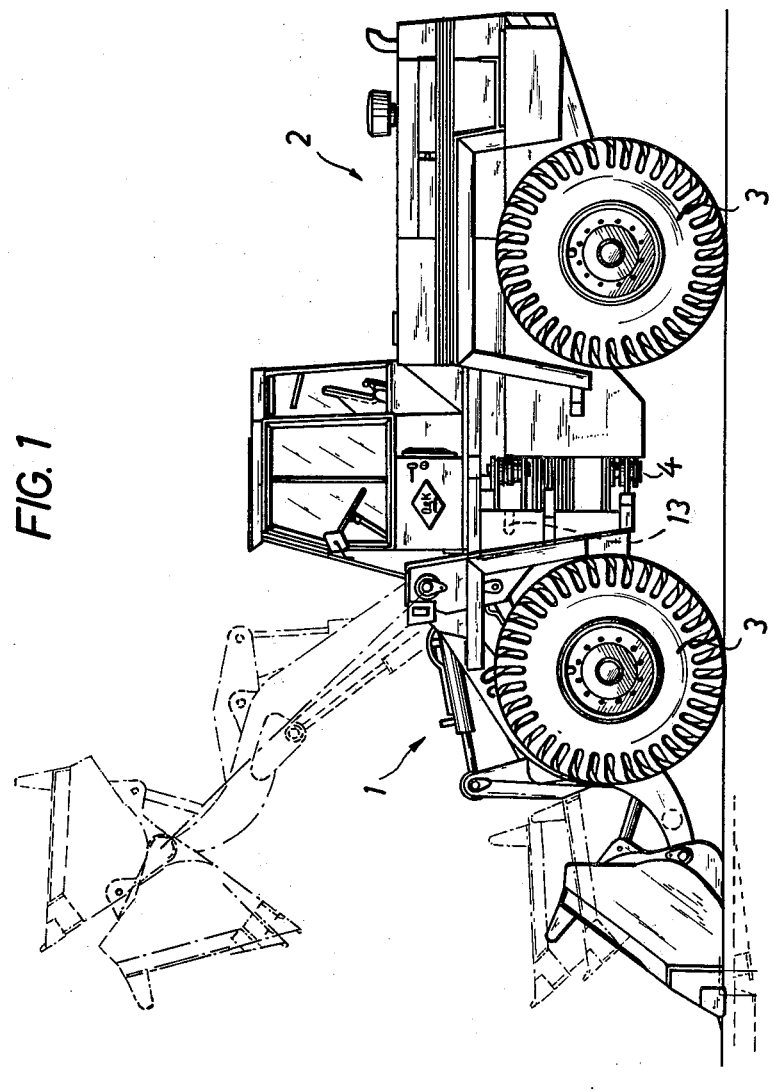
FIG. 1 is a side view of a wheel loader with articulated steering system, according to the invention.
Figure 2:
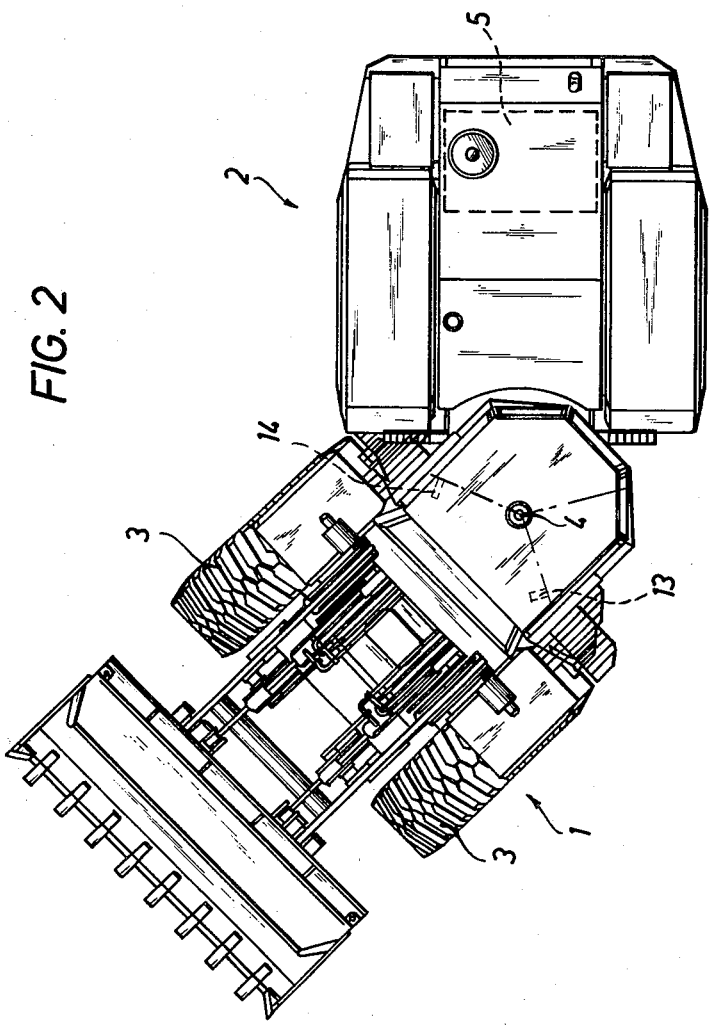
FIG. 2 is a top view of FIG. 1.
Figure 3:
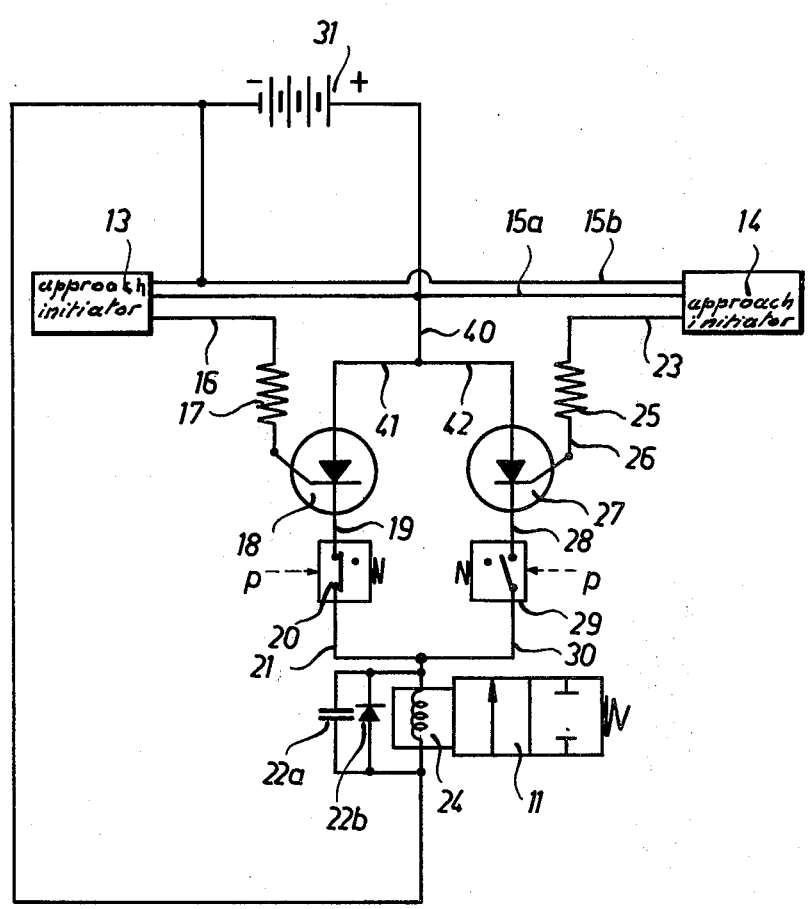
FIG. 3 illustrates an electric control diagram for the device according to the invention which is to be built into the two vehicle sections and shows the arrangement during the steering operation toward the left.
Figure 4:
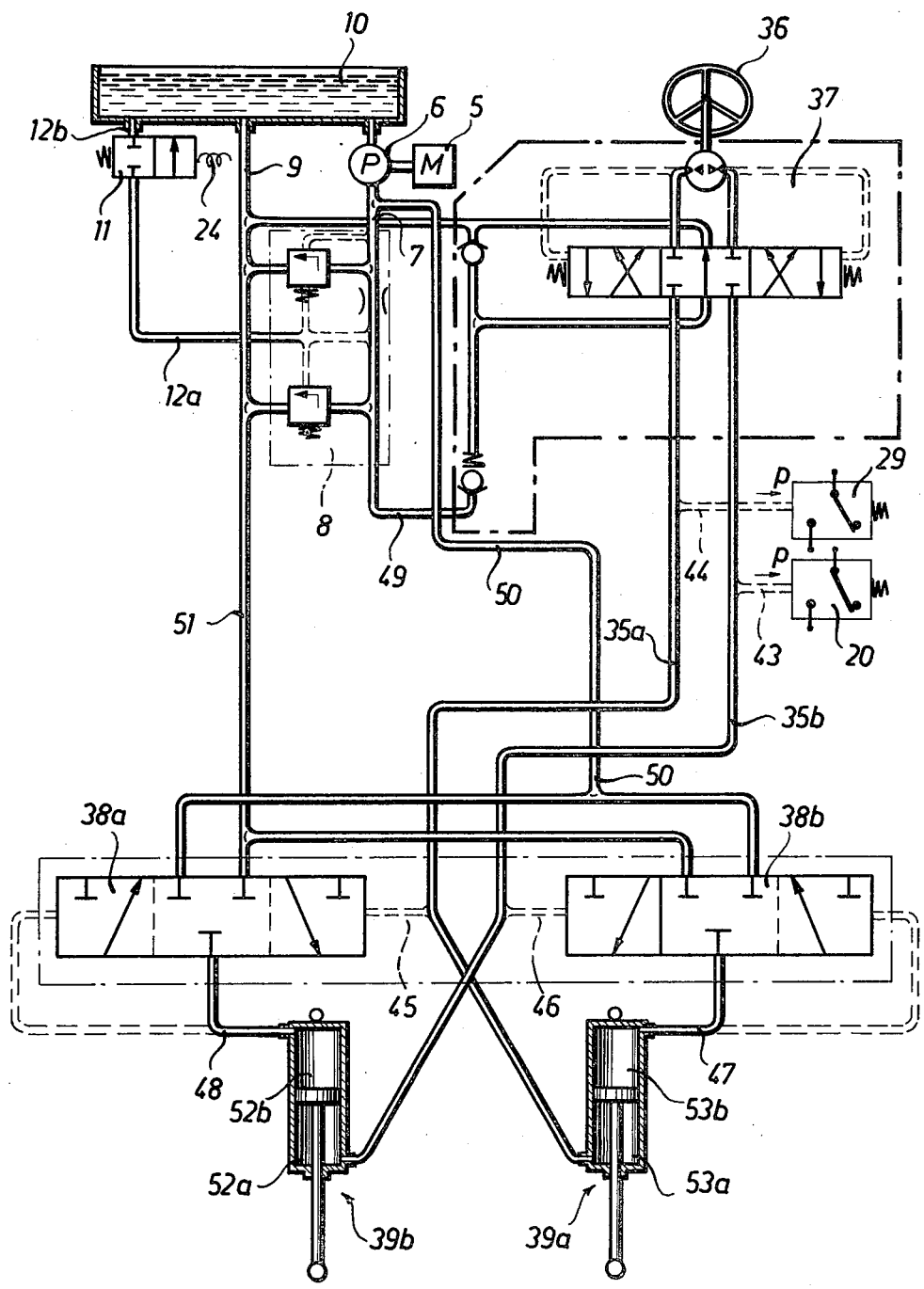
FIG. 4 is a diagrammatical illustration of the hydraulic part of the steering system when occupying its left position.

The above outlined objects have been realized according to the present invention by so arranging one approaching initiator (Näherungsinitiator) each on the rear carriage that when turning the steering wheel and when the front carriage approaches the rear carriage, a pertaining thyristor is triggered so that a magnetic valve attracts which through a conduit communicates with a tank.

According to a further development of the invention, the two approaching initiators are through common supply conduits connected to each other and through additional conduits, resistors, thyristors, and pressure switches are connected to a magnetic valve and through the latter to the minus pole of an electric battery while a condenser and a diode are arranged in parallel to the magnetic valve.

Referring now to the drawings in detail, the wheel loader illustrated in the drawings, comprises the front carriage 1 and the rear carriage 2. Both carriages are movable on pneumatic tire equipped wheels 3 and by means of the articulated joint 4 are pivotally connected for pivoting about the vertical axis. The main drive motor 5 drives the hydraulic steering pump 6 which conveys the pressure oil required for steering the wheel loader. By means of the hydraulic conduit 7 the pressure flow limiting valve 8 is connected to the hydraulic steering pump 6. From the pressure flow or pressure current limiting valve 8, a return oil conduit 9 leads directly to the tank 10. By means of the magnetic valve 11 which is connected through the hydraulic steering conduits 12a and 12b with the tank 10, the flow-through is controlled by the pressure flow limiting valve 8. The hydraulic control pump 6 feeds hydraulic oil through said valve 8, the manual steering mechanism 37 actuated by the steering wheel 36, the hydraulic conduits 35a and 35b, and the servo control valves 38a and 38b to the hydraulic steering cylinders 39a and 39b. The pressure switches 20 and 29 are through hydraulic conduits 43 and 44 connected to the hydraulic conduits 35a and 35b. The servo control valves 38a and 38b which through the hydraulic conduits 47 and 48 communicate with the hydraulic steering cylinders 39a and 39b are through the hydraulic conduit 50 actuated upon the hydraulic control pump 6. On both sides of the front carriage 1, there are arranged the approaching initiators 13 and 14 which through electric conductors 15a and 15b communicate with each other and with the electric battery 31. Furthermore, the electric conductor 16 leads from the initiator 13 through grid resistors 17, the pertaining thyristor 18, and from there through the electric conductor 19, the pressure switch 20 and the electric conductor 21 to the magnetic valve 11. From the initiator 14, the connection to the magnetic valve 11 is checked through the electric conductor 23, the grid resistor 25, the electric conductor 26, the thyristor 27, the electric conductor 28, the pressure switch 29, and the electric conductor 30. Arranged in parallel to the magnetic valve 11 are a condenser 22a and a diode 22b in order to avoid an overhead triggering of the thyristors 18 and 27 by too high induction voltages of the magnetic coil 24 in the magnetic valve 11. The operation is as follows:

When the hydrostatic servo steering system for instance by turning the steering wheel 36 is turned toward the left in counterclockwise direction, the magnetic valve 11 is closed so that a pressure builds up in the hydraulic conduits 49 and 50 since the hydraulic pump 6 delivers oil under pressure. From the hydraulic conduit 49, the pressure oil flows through the manual steering unit 37 through the hydraulic conduit 35a to the cylinder chamber 53a of the hydraulic steering cylinder 39a. In addition thereto, the pressure in the hydraulic conduit 35a actuates the servo control valve 38a whereby the cylinder chamber 52b of the hydraulic steering cylinder 39b is acted upon by oil from the hydraulic conduit 50 through the hydraulic conduit 48. Due to the pressure drop in the hydraulic conduit 35b, the pressure switch 20 is by spring force turned on whereas the pressure switch 29 remains switched off in view of the pressure prevailing in the hydraulic conduit. The pressures in the hydraulic conduits 35a and 40a bring about the steering turn toward the left as long as the steering wheel 36 is turned. The oil from the pressureless cylinder chambers 52a and 53b of the hydraulic cylinders 39a and 39b flows through the hydraulic conduits 47, 51 and 35b, the manual steering unit 37, and the return oil conduit 9 back to the tank 10. If the steering wheel is turned further toward the left up to its abutment which means until the frame of the front carriage 1 and the rear carriage 2 nearly touch each other, the approaching initiator 13 emits a positive pulse onto the self holding circuit operating with the thyristor 18. As a result thereof, the thyristor 18 is triggered which means it permits the current to pass through. The current flows from the plus pole of electric battery 31 through the thyristor 18, the pressure switch 20, the electric conductor 21, and the magnetic coil 24 to the minus pole. The magnetic valve 11 attracts, and opens the control conduits 12a and 12b whereby the return oil conduit 19 of the pressure flow limiting valve 8 to the tank 10 is freed so that the supply pressure for the steering mechanism collapses. A further steering toward the left abutment is now no longer possible so that no steering power is used any longer. The through flow of the current through the thyristor 18 and thus the pressure switch-off is also retained when the switching range of the approaching initiator 13 is exceeded. Only when the steering wheel 36 is moved toward the right, the pressure switch 20 opens whereby the current flow through the thyristor 18 is interrupted. The magnetic valve 11 will then immediately close and the steering pressure is built up again. The steering is again possible in both directions. The pressure switches 20 and 29 are in the specific embodiment shown so adjusted that when the steering is not actuated the said pressure switches 20 and 29 are opened by the remaining pressure (approximately 3 bar) which prevails in the hydraulic conduits 35a and 35b and the pressure switches 20 and 29 are closed again only at pressures below approximately 3 bar (for instance pressure switch 20 when being turned left). In this way it will be avoided that the thyristors 18 and 27 are triggered for instance when the device is triggered by possible interfering pulses.

As will be evident from the above, the advantage of the arrangement according to the present invention is seen primarily in that when steering, the steered vehicle parts will no longer abut each other because prior to such abutment, the hydraulic actuation is switched off so that no superfluous steering power is employed and a mechanical vibration or oscillation of the loader about its vertical axis of articulation is prevented which may be caused by a self excitation of the steering arrangement.

It is, of course, to be understood that the present invention is, by no means, limited to the specific showing in the drawings but also comprises any modifications within the scope of the appended claims. Thus, the magnetic valve 11 may with the condenser 22 and the diode 22b be placed for instance also into the electric conductor 32. The pressure switch 20 may be located in the electric conductor 33, and the pressure switch 29 may be for instance also located in the electric conductor 34. Furthermore, a plurality of diodes may be provided.

What we claim is:

1. A device for a contact-free limitation of the the movement of hydraulically operable mechanical elements, especially a steering device for bucket wheel loaders, which includes: a front carriage, a rear carriage pivotally connected to said front carriage for pivotal movement relative thereto about a vertical axis, two thyristors arranged on opposite sides of said vertical axis, two approaching initiators arranged on one of said carriages and on opposite sides of said axis while respectively being associated with said thyristors, a fluid reservoir, a steering pump, cylinder-piston means operatively connected to one of said carriages for angularly moving the same relative to the other carriage within the angle range defined by said approaching initiators, conduit means for conveying fluid from said reservoir through said steering pump to said cylinder-piston means and vice versa, and magnetic valve means arranged in said conduit means and controlled by said thyristors whereby in response to an angular approach of one of said carriages relative to the other carriage the respective pertaining thyristor is triggered by said respective approach initiator and said magnetic valve is energized and establishes connection of said steering pump with said tank.

2. A device according to claim 1, which includes: a source of direct electric current, common electric conductor means interconnecting said two approaching initiators, additional electric circuit means including said thyristors and also including grid resistors associated with said thyristors and also including pressure switches, said additional electric circuit means electrically connecting said two approaching initiators with the minus pole of said direct current source, and a condenser and a diode arranged in parallel to said magnetic valve.

* * * * *